US008688361B2

(12) United States Patent
Herz et al.

(10) Patent No.: US 8,688,361 B2
(45) Date of Patent: Apr. 1, 2014

(54) METHOD FOR REVERSIBLY CODING AN ENGINE CONTROLLER FOR A MOTOR VEHICLE IN MANIPULATION-PROOF FASHION, AND ENGINE CONTROLLER

(75) Inventors: Joerg Herz, Wettstetten (DE); Richard Brecht, Neckarsulm (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 13/991,553

(22) PCT Filed: Oct. 29, 2011

(86) PCT No.: PCT/EP2011/005483
§ 371 (c)(1), (2), (4) Date: Jun. 4, 2013

(87) PCT Pub. No.: WO2012/072171
PCT Pub. Date: Jun. 7, 2012

(65) Prior Publication Data

US 2013/0253807 A1 Sep. 26, 2013

(30) Foreign Application Priority Data

Dec. 4, 2010 (DE) ........................ 10 2010 053 488

(51) Int. Cl.
*G06F 19/00* (2011.01)

(52) U.S. Cl.
USPC .............................. 701/115; 700/90; 711/100

(58) Field of Classification Search
USPC ............. 701/115; 700/90; 711/100, 103, 163
See application file for complete search history.

(56) References Cited

U.S. PATENT DOCUMENTS

| | | | | |
|---|---|---|---|---|
| 6,850,252 | B1 * | 2/2005 | Hoffberg | 715/716 |
| 7,013,469 | B2 * | 3/2006 | Smith et al. | 719/328 |
| 7,017,162 | B2 * | 3/2006 | Smith et al. | 719/328 |
| 7,555,757 | B2 * | 6/2009 | Smith et al. | 719/328 |
| 7,813,822 | B1 * | 10/2010 | Hoffberg | 700/94 |
| 7,974,714 | B2 * | 7/2011 | Hoffberg | 700/94 |
| 8,483,392 | B2 * | 7/2013 | Mueck et al. | 380/277 |
| 2004/0117106 | A1 | 6/2004 | Dudel et al. | |

FOREIGN PATENT DOCUMENTS

| | | |
|---|---|---|
| DE | 3802241 | 8/1989 |
| DE | 10020977 | 10/2001 |
| DE | 10118298 | 11/2002 |
| DE | 10238093 | 3/2004 |
| DE | 10238095 | 3/2004 |
| DE | 102005039128 | 2/2007 |
| DE | 102010053488.9 | 12/2010 |
| EP | 1128242 | 8/2001 |
| WO | PCT/EP2011/005483 | 10/2011 |

OTHER PUBLICATIONS

English language International Search Report for PCT/EP2011/005483, mailed Feb. 16, 2012, 3 pages.
English language International Preliminary Report on Patentability, downloaded from WIPO website Jun. 4, 2013, 6 pages.

* cited by examiner

*Primary Examiner* — John Kwon
(74) *Attorney, Agent, or Firm* — Staas & Halsey LLP

(57) ABSTRACT

A reversible, manipulation-proof method encodes an engine controller for a motor vehicle, which is designed for use in motor vehicles with different operating characteristics. At least one first operating characteristic is defined in invariant form for the motor vehicle, with which method during commissioning of the engine controller the first operating characteristic is stored in the engine controller during and/or after an authentication process in such a way that it can only be changed during and/or after a further authentication process.

17 Claims, 2 Drawing Sheets

METHOD FOR REVERSIBLY CODING AN ENGINE CONTROLLER FOR A MOTOR VEHICLE IN MANIPULATION-PROOF FASHION, AND ENGINE CONTROLLER

CROSS REFERENCE TO RELATED APPLICATIONS

This application is based on and hereby claims priority to International Application No. PCT/EP2011/005483 filed on Oct. 29, 2011 and German Application No. 10 2010 053 488.9 filed on Dec. 4, 2010, the contents of which are hereby incorporated by reference.

BACKGROUND

The invention relates to a method for the reversible, manipulation-proof encoding of an engine controller for a motor vehicle and an engine controller for use with such a method.

Engine controllers for motor vehicles are now widely known and are designed for the control, regulation and monitoring of engine functions. With variable characteristics of a motor vehicle, the provision for engine controllers of software and/or electronics for such different operating characteristics is also known. The setting of the engine controller to such operating characteristics of a motor vehicle is otherwise also referred to as encoding. In relation to such operating characteristics, which can change during the lifetime of a motor vehicle, recoding is consequently possible.

However, there are operating characteristics of a motor vehicle, which may be inaccessible to such recoding for various reasons, so that controllers are specially designed and developed for the operating characteristics, referred to below as first operating characteristics. For example, the exhaust gas treatment of the motor vehicle may not be recoded, as recoding would activate other error logs or displays, which e.g. would enable manipulation during an inspection. Consequently, there are some legal regulations that do not allow recoding of an engine controller in relation to the first operating characteristics. Thus e.g. in Germany there are regulations for the performance, the exhaust gas treatment or the activation/deactivation of start-stop functionality.

As engine controllers are thus designed specifically for these first operating characteristics, not only does the number of software and hardware variants increase in order to be able to meet diverse requirements, but a plurality of engine controller variants is also produced, which brings with it a logistical cost and adversely influences the operability and the discrimination in relation to the various engine controller variants. The significant factors for the large number of engine controller variants are e.g. different performance variants, different transmission variants, different exhaust gas treatment variants, start-stop functionality or no start-stop-functionality as well as different maximum speeds. There are thus high costs as a result of the production and maintenance of the respective engine controller variants in development, high logistical costs in production and high logistical costs in customer service. The different variants have to be picked even during the final installation and configuration of the engine controller on a motor vehicle.

SUMMARY

One potential object is to specify a capability of being able to cover different first operating characteristics with a single engine controller.

The inventors proposed a method for the reversible, manipulation-proof encoding of an engine controller for a motor vehicle, which is designed for use in motor vehicles with different operating characteristics, wherein at least one first operating characteristic is non-variably defined for a motor vehicle, with which method during the commissioning of the controller the first operating characteristic is stored in the engine controller during and/or after an authentication process in such a way that it can only be changed during and/or after a further authentication process.

It is thus proposed to provide an engine controller that can combine at least some of the engine controller variants known in the related art, which can thus be used for a plurality of values of first operating characteristics. In order to enable this, it is provided at the point in time of the commissioning of the controller to encode the first operating characteristics, which must be invariant for a specific motor vehicle, in the engine controller in such a way that they are invariantly stored for the service life of the engine controller in a specified motor vehicle and are thus manipulation-proof, whether to prevent manipulation and/or as a result of a corresponding legal regulation.

In order to enable said manipulation protection, the storage is only possible during and/or after, especially immediately after, an authentication process, which is thus carried out during commissioning of the engine controller. With particular advantage, as first discussed in detail below, the authentication process can be an authentication process that in any case already runs during commissioning of the engine controller (and only during this), because this is thus also used to enable the setting of the engine controller in relation to the first operating characteristic. Of course, a dedicated authentication process that is especially provided for setting the first operating characteristics is also conceivable. During such an authentication process e.g. suitable keys present in the engine controller and available at the manufacturer's facility can be compared, so that consequently a key-based authentication method can be used as the authentication process. However, other types of authentication are also conceivable.

A particular advantage of the proposed method arises from the fact that an authentication process employed during commissioning is used, because in this way it is especially possible to still change the first operating characteristics during a further such authentication process, so that e.g. a used engine controller can be used again in a different and/or significantly altered motor vehicle. This means that it is still possible to recode an engine controller during commissioning in a new motor vehicle—and also so that it is invariant and manipulation-proof for said new motor vehicle. The process running in the context of the proposed method can thus be referred to as "reversible one-time encoding".

By said reversible one-time encoding, the option is provided in an engine controller of manipulation-proof and encodable storage in the engine controller of significant factors or operating characteristics, e.g. in relation to performance, exhaust gas treatment and start-stop. This makes it possible in the future to combine a plurality of variants in relation to the first operating characteristics in a single engine controller, whereby the number of engine controller variants is significantly reduced, so that consequently costs and logistical complexity are also reduced.

As already mentioned, the performance of the motor vehicle and/or the exhaust gas treatment of the motor vehicle and/or the activation or deactivation of a start-stop mode can be used as the first operating characteristic. Of course, other first operating characteristics are also conceivable, which are to be stored in an invariant form for a motor vehicle and thus are to be stored in a manipulation-proof manner in the engine controller. It should be noted at this point for clarification, that furthermore the engine controller can of course be designed as usual for different values of second operating characteristics not corresponding to the first operating characteristics, but which can be set by a normal encoding process.

In a further embodiment of the method at least some of the first operating characteristics can be stored in a memory element of the controller, especially an EEPROM. An EEPROM has proved to be particularly suitable, being generally known as an electrically erasable programmable read-only memory. The encoding can thus be achieved reliably.

Preferably, after storage of at least some of the first operating characteristics, a locking bit that blocks write access to the memory locations of the first operating characteristics can be set. This provides an elegant solution, in order to ultimately block access to the corresponding memory locations of the first operating characteristics following commissioning of the engine controller in the motor vehicle; the locking bit thus ultimately corresponds to a type of "status flag", by which the memory locations are "frozen" as it were, so that they remain invariant and thus manipulation-proof until a further commissioning process takes place.

Erasure of the locking bit is thus only conceivable during a further commissioning of the engine controller, so that it can be provided that a locking bit is erased during and/or immediately following termination of the authentication process, so that storage of at least some of the first operating characteristics takes place following the authentication process. It should be noted at this point that during commissioning it can of course also be provided overall to erase a possibly previously present encoding of the engine controller, so that besides the locking bit the memory locations, especially related to the first operating characteristics, but also possibly related to the further, second operating characteristics, can be cleared again.

In these embodiments it can be provided with particular advantage that at least some of the first operating characteristics are stored during the first evaluation of a code word defining the second operating characteristics, which especially do not correspond to the first operating characteristics. Such code words are basically known and contain in compact form, e.g. as a 10-bit-long code word, values of the operating characteristics to be set up. According to the proposal, the code word now also contains the first operating characteristics, which can be set up for the first evaluation of such a code word in the engine controller. For subsequent recodings of second operating characteristics, for which a new code word is sent to the engine controller, the first operating characteristics contained in the code word can e.g. be used for a consistency check or similar.

The use of such a code word is particularly advantageous with the use of a locking bit because a standardized evaluation and encoding algorithm can also be used as soon as when first evaluating the code word, so that in further encoding processes in the same motor vehicle owing to the locking bit there can no longer be a risk that the first operating characteristics can also be changed.

In a particularly preferred embodiment of the method it can be provided that the authentication takes place during a teaching process. When teaching the engine controller in a new motor vehicle during the commissioning, in general in any case a plurality of data items are transferred to the engine controller in encoded form, wherein such teaching processes then also include an authentication process, which is also used with particular advantage with the method in order to also provide authentication for setting the first operating characteristics. Thus no new additional authentication is necessary as the teaching process takes place during commissioning (and only then) in any case and thus an authentication process is already provided.

For example, the configuration of an immobilizer with the participation of a plurality of controllers can be used as an authentication process. Immobilizers are widely known in the related art. In relation to this it has been proposed to distribute the necessary information to a plurality of controllers in order to inhibit manipulation. At the end of the configuration of the immobilizer it is checked whether this has been installed correctly, so that e.g. a checksum or similar can be formed. Already at this point, if the immobilizer is faulty any injection process in the motor vehicle is blocked. Only if the immobilizer has been correctly configured, if not all first operating characteristics have already been set during the configuration of the immobilizer, e.g. can the locking bit be cleared and then storage of at least some of the first operating characteristics in the memory element can take place, whereupon the locking bit is set again.

It can further be provided that at least one operating characteristic, especially the performance of the motor vehicle, is stored during the configuration of the immobilizer. In particular, all first operating characteristics can already be set during the configuration of the immobilizer that takes place in encrypted form and that is considered as an authentication process, but it often is already provided in any case that the performance of the motor vehicle is transferred in the form of a performance class during configuration of the immobilizer. Accordingly it is beneficial to provide at least this setting as early as during the configuration of the immobilizer.

Besides the method, the inventors also propose an engine controller for use in motor vehicles with different operating characteristics, wherein at least one first operating characteristic is defined as invariant for a motor vehicle, which is especially designed to implement the proposed method while communicating with a computing device, especially a computing device external to the motor vehicle, especially a tester. The proposed engine controller thus contains not only the contents, i.e. software and/or hardware in relation to just one value of a first operating characteristic, but the contents for a plurality of values of the first operating characteristics, e.g. for a plurality of performance classes, for activation and deactivation of the start-stop mode and/or for a plurality of exhaust gas treatment variants. Furthermore, the controller is designed so that, following the specification of the first operating characteristics during commissioning of the engine controller for a certain motor vehicle during the service life of the engine controller in said motor vehicle, manipulation of the first operating characteristics is no longer possible; the engine controller thus contains the software and/or hardware components required for carrying out the method, namely the reversible one-time encoding. It can thus e.g. be provided that an EEPROM is provided for invariant storage of at least some of the first operating characteristics for a motor vehicle.

For commissioning of the engine controller the following procedure can e.g. be adopted. In the case of a brand new engine controller, it is fitted into the motor vehicle without a code word entered in the EEPROM and then taught the configuration of the immobilizer in the motor vehicle. A performance class can thereby be set as the first operating characteristic as early as this. Then the engine controller is encoded by receiving the code word e.g. by the external communications device or by a different communications link, e.g. an Internet connection. Following suitable encoding of the engine controller the memory locations of the code word in the EEPROM characterized as being reversibly one-time encodable are frozen, which means that e.g. a locking bit is set for the memory locations containing the first operating characteristics. Said memory locations/encoding cells can no longer be recoded without a teaching/relearning process of the immobilizer, whereas the memory locations corresponding to the remaining, second operating characteristics, which correspond to the other parts of the code word, can be recoded any number of times.

With a used engine controller the engine controller is already taught, encoded and has thus already "locked" memory locations in the EEPROM, e.g. a setting to exhaust gas treatment according to EU5 and activated start-stop mode. The engine controller is now installed in a different motor vehicle, which e.g. has exhaust gas treatment according to EU2 and no start-stop mode. Consequently the engine controller cannot be operated in said motor vehicle in the current state, so that it must now be taught about the configuration of the immobilizer on the new motor vehicle, wherein the locking bit is cleared and possibly the entire code word is erased in the EEPROM again. The performance class of the motor vehicle can also already be set during the configuration of the immobilizer. Then the engine controller is encoded again, in that the code word is received and suitably stored in the EEPROM, wherein memory locations of the code word in the EEPROM characterized as being reversibly one-time encodable memory locations are in turn frozen by setting the locking bit. In this way, even for use in another motor vehicle manipulation is not possible in relation to the first operating characteristics. Other operating characteristics contained in the code word can however be recoded as required.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
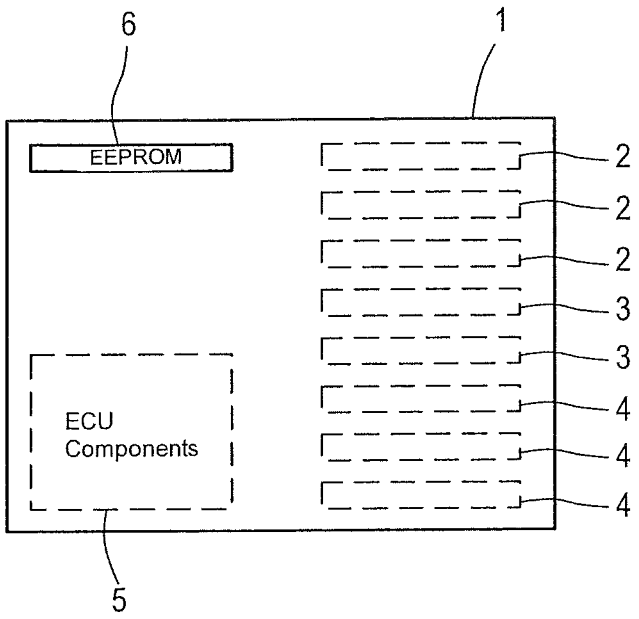
FIG. 1 shows a sketch of the principle of a proposed controller.

Reference will now be made in detail to the preferred embodiments of the present invention, examples of which are illustrated in the accompanying drawings, wherein like reference numerals refer to like elements throughout.

FIG. 1 shows a sketch of the principle of a proposed engine controller 1. Various functions are provided in the engine controller 1 as software and/or hardware components. The engine controller 1 thereby especially contains, as indicated in FIG. 1, a plurality of components 2 for different performance classes, components 3 for operation with start-stop functionality and without start-stop functionality and components 4 for various types of exhaust gas treatment. The performance class, the type of the exhaust gas treatment and the activation or deactivation of the start-stop modes are first operating characteristics, which are thus characterized in that they must be defined for a certain motor vehicle, i.e. they are to be invariant and manipulation-proof. The reason for this is that e.g. deception during an inspection by manipulation of the engine controller 1 and/or a violation of legal regulations are to be avoided. Of course it is also conceivable that other first operating characteristics can be considered, which are to be set in the engine controller 1 as invariant for a certain motor vehicle.

It should be stated at this point that the engine controller 1 also contains a plurality of components for different further, second operating characteristics, which are to be able to be amended, i.e. recodable, during the service life of the engine controller within a certain motor vehicle.

Furthermore, the engine controller 1 contains the necessary components 5, again software and/or hardware components, in order to be able to carry out the method, which enables reversible one-time encoding in relation to the first operating characteristics. The engine controller 1 comprises an EEPROM 6 for storing at least some of the first operating characteristics and the second operating characteristics, which can be provided to the engine controller 1 as a code word, e.g. by a tester.

Figure 2:
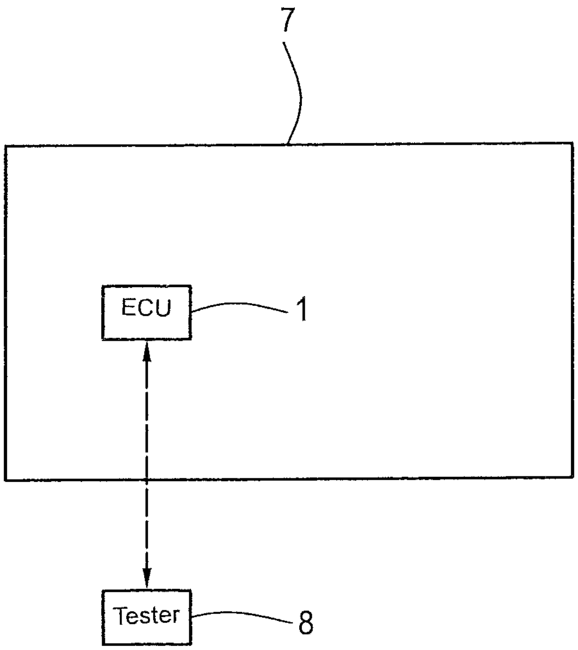
FIG. 2 shows a motor vehicle during commissioning of the engine controller.

If the engine controller 1 is installed in a certain motor vehicle 7 as an as yet unencoded engine controller 1 or a used engine controller 1, as shown in FIG. 2, during and/or following an authentication process during commissioning of the engine controller 1 the first operating characteristics can be set and stored in invariant form, i.e. manipulation-proof, for said motor vehicle 7. For commissioning the engine controller 1 communicates e.g. with an external computing device 8, e.g. a tester.

Figure 3:
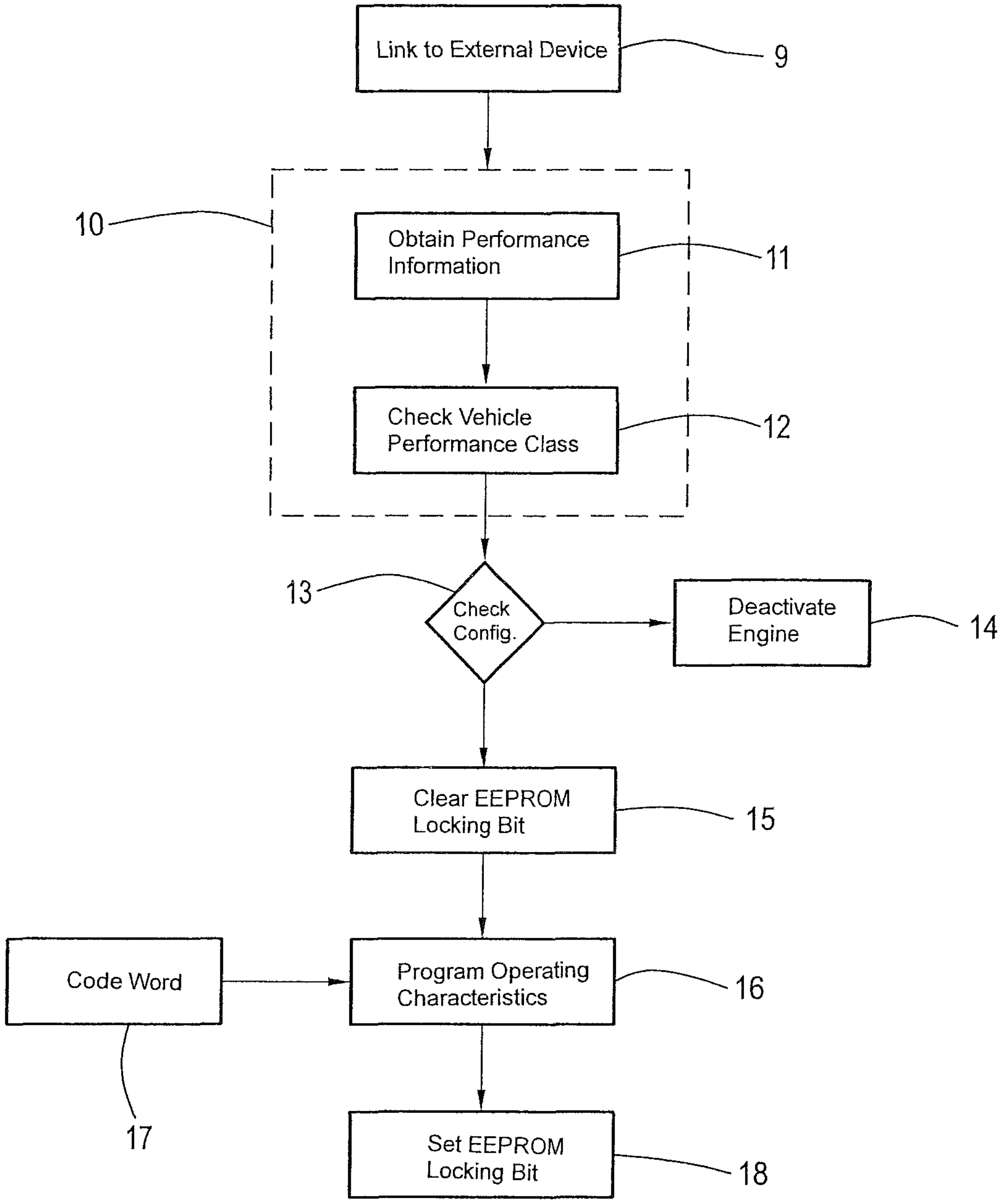
FIG. 3 shows a flow diagram of an exemplary embodiment of the proposed method.

FIG. 3 now shows the flow diagram of an exemplary embodiment of the method. In a step 9 the communications link between the engine controller 1 and the external computing device 8 is established, so that e.g. data about the motor vehicle 7 can be called up from a database. During the subsequent teaching process or relearning process 10, of which only the steps relevant to the method are illustrated, the configuration of an immobilizer now also takes place among other things. This is presently designed so that it distributes its data to a plurality of controllers, among them the engine controller 1. During the configuration of the immobilizer information about the performance class of the motor vehicle 7 is now also obtained from the database, step 11. In a step 12 it is now checked whether the corresponding components 2 for this performance class are contained in the engine controller 1 and the engine controller 1 is set up for the corresponding performance class. As the performance is a first operating characteristic, this setting-up can only take place during said teaching process, specifically the configuration of the immobilizer, which takes place in encrypted form and requires or represents an authentication process. Therefore a change of the setting of the performance class as a first operating characteristic is always only possible during commissioning or teaching of the engine controller 1, and recoding, hence manipulation, cannot be carried out at a later point in time.

A check is made in a step 13 as to whether the immobilizer has been correctly configured, hence moreover whether the performance class has also been set correctly, as this forms part of the immobilizer information provided in a distributed manner in the present exemplary embodiment, in the event of whose manipulation an inconsistency is detected.

If, e.g. using a checksum, it is determined that there is a fault in the immobilizer, then an error log entry and deactivation of any possibility of injection take place in a step 14, so that the motor vehicle 7 cannot be started.

However, if the immobilizer is in order, then in a step 15 a locking bit in EEPROM 6 is set to the value "cleared", so that other first operating characteristics, in this case the activation/deactivation of the start-stop mode and the exhaust gas treatment, can also be written to associated memory locations in the EEPROM 6. In addition, it can be provided that the memory locations in EEPROM 6 associated with the entire code word are erased. With an engine controller 1 that is being used for the first time there are of course not yet any values, but in the case of recycling of the engine controller 1 in a new motor vehicle 7, recoding for the new motor vehicle 7 is enabled.

Then a standard encoding process takes place in a step 16, for which purpose the code word 17, which contains the values of all operating characteristics in compact form, or all operating characteristics apart from the performance class, is transferred to the engine controller 1. The code word 17 is now evaluated in order to describe corresponding memory locations in EEPROM 6, wherein because the locking bit is cleared, the memory locations associated with the first operating characteristics exhaust gas treatment and start-stop mode can also be written in step 16. The memory locations for second operating characteristics, which are yet to be recodable in later stages, are already set in step 16 however.

Finally, the locking bit is set to "locking" again in a step 18, so that only the memory locations of the EEPROM 6 associated with the second operating characteristics can still be changed if subsequent recoding takes place. The first operating characteristics are invariant during the entire service life of the engine controller 1 in the motor vehicle 7, and are thus manipulation-proof, because the locking by the locking bit would only be unlocked if a new teaching process, specifically the secure configuration of the immobilizer, were to take place. Recoding of second operating characteristics is however conceivable without problems in a further standard encoding step 16, wherein in turn a corresponding code word 17 is then evaluated. The first operating characteristics cannot be converted, however.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

The invention claimed is:

1. A method for reversible, manipulation-proof encoding of an engine controller designed for use in different motor vehicles with respective different operating characteristics, comprising:

defining a first operating characteristic as being invariant for a motor vehicle;

during commissioning of the engine controller for the motor vehicle, initiating a commissioning authentication process; and after initiating the commissioning authentication process, storing the first operating characteristic in such a way that it is changeable only after initiating a further authentication process.

2. The method as claimed in claim 1, wherein the first operating characteristic is at least one characteristic selected from the group consisting of a characteristic related to performance of the motor vehicle, a characteristic related to exhaust gas treatment for the motor vehicle, and a characteristic related to activation or deactivation of a start-stop mode.

3. The method as claimed in claim 1, wherein the first operating characteristic is stored in an Electrically Erasable Programmable Read-Only Memory (EEPROM) memory element of the engine controller.

4. The method as claimed in claim 1, wherein there are a plurality of first operating characteristics, and some of the first operating characteristics are stored in an Electrically Erasable Programmable Read-Only Memory (EEPROM) memory element of the engine controller.

5. The method as claimed in claim 3, wherein the first operating characteristic is stored in a memory location, and after storing the first operating characteristic, a locking bit is set to block write access to the memory location of the first operating characteristic.

6. The method as claimed in claim 5, wherein the locking bit is cleared after the further authentication process.

7. The method as claimed in claim 5, wherein first and second code words respectively define and redefine second operating characteristics not corresponding to the first operating characteristic, and the first operating characteristic is stored during evaluation of the first code word.

8. The method as claimed in claim 1, wherein the commissioning authentication process and the further authentication process take place during a teaching process and a further teaching process, respectively.

9. The method as claimed in claim 8, wherein during both the commissioning authentication process and the further authentication process, an immobilizer is configured to participate with a plurality of controllers.

10. The method as claimed in claim 9, wherein the first operating characteristic is a characteristic related to performance of the motor vehicle, and the first operating characteristic is stored during configuration of the immobilizer.

11. The method as claimed in claim 1, wherein a plurality of second operating characteristics are stored in the engine controller, the second operating characteristics are re-writable and variable operating characteristics, and data for the second operating characteristics is provided to the engine controller via a code word.

12. The method as claimed in claim 11, wherein the code word contains both the first and second operating characteristics.

13. The method as claimed in claim 12, wherein a plurality of code words are provided to the engine controller.

14. The method as claimed in claim 13, wherein the first operating characteristic is stored during evaluation of a first code word.

15. The method as claimed in claim 14, wherein the first operating characteristic is not changed during evaluation of subsequent code words, and the first operating characteristic is used to check validity of subsequent code words.

16. An engine controller for use in different motor vehicles with respective different operating characteristics, comprising:

a memory for reversible, manipulation-proof encoding of a first operating characteristic defined as invariant for a motor vehicle, the first operating characteristic being stored during communications with a tester computing device external to the motor vehicle, the first operating characteristic being stored after initiating a commissioning authentication process performed during commissioning of the engine controller for the motor vehicle, the first operating characteristic being stored in such a way that it is changeable only after initiating a further authentication process.

17. The engine controller as claimed in claim 16, wherein the memory comprises an Electrically Erasable Programmable Read-Only Memory (EEPROM) for invariant storage of the first operating characteristic.

* * * * *